United States Patent
Stilgenbauer et al.

(10) Patent No.: US 10,487,724 B2
(45) Date of Patent: Nov. 26, 2019

(54) CONTROL ARRANGEMENT OF AN EXHAUST-GAS TURBOCHARGER

(71) Applicant: BorgWarner Inc., Auburn Hills, MI (US)

(72) Inventors: Michael Stilgenbauer, Bolanden (DE); Matthias Ruh, Offenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 76 days.

(21) Appl. No.: 15/119,764

(22) PCT Filed: May 5, 2015

(86) PCT No.: PCT/US2015/029138
§ 371 (c)(1),
(2) Date: Aug. 18, 2016

(87) PCT Pub. No.: WO2015/171541
PCT Pub. Date: Nov. 12, 2015

(65) Prior Publication Data
US 2017/0058761 A1    Mar. 2, 2017

(30) Foreign Application Priority Data

May 8, 2014  (DE) .................... 20 2014 003 918 U
Sep. 17, 2014  (DE) .................... 20 2014 007 538 U

(51) Int. Cl.
*F02B 37/18*    (2006.01)

(52) U.S. Cl.
CPC ........... *F02B 37/183* (2013.01); *Y02T 10/144* (2013.01)

(58) Field of Classification Search
CPC ...... F02B 37/18; F02B 37/183; F02B 37/186; Y02T 10/144
(Continued)

(56) References Cited

U.S. PATENT DOCUMENTS 3,885,771 A * 5/1975 Baumann .................. F16K 1/24
251/280
2002/0136630 A1* 9/2002 Jinnai ................... F01D 17/165
415/1

(Continued)

FOREIGN PATENT DOCUMENTS

CN    101649773 A    2/2010
CN    101960117 A    1/2011

(Continued)

OTHER PUBLICATIONS

An English Translation copy to Takashi Mikogami (Pub. Number JP 01-179132 U), Published on Dec. 22 1989.*

(Continued)

*Primary Examiner* — Thai Ba Trieu
(74) *Attorney, Agent, or Firm* — Eric L. Doyle; Stephan A. Pendorf; Patent Central LLC

(57) ABSTRACT

A control arrangement (1) of an exhaust-gas turbocharger (4) which has a charger housing (2), the control arrangement (1) having a spindle (15) which has a first end region (24) arranged outside the charger housing (2) and a second end region (25) arranged within the charger housing (2) and having a valve disk (18) which is connected to the spindle (15), wherein the valve disk (18) and the spindle (15) are separate components, and wherein the spindle (15) is connected by way of its second end region (25) to the valve disk (18) by means of a connecting means (26).

19 Claims, 8 Drawing Sheets

(58) Field of Classification Search
 USPC .......................................................... 60/602
 See application file for complete search history.

(56) References Cited

U.S. PATENT DOCUMENTS

| | | | | |
|---|---|---|---|---|
| 2005/0120998 | A1* | 6/2005 | Kobayashi | F02D 11/10 |
| | | | | 123/399 |
| 2011/0000209 | A1 | 1/2011 | Boening et al. | |
| 2013/0149114 | A1 | 6/2013 | Kohler | |
| 2013/0247563 | A1* | 9/2013 | Martens | F02B 37/186 |
| | | | | 60/602 |
| 2015/0147162 | A1* | 5/2015 | Stilgenbauer | F02B 37/183 |
| | | | | 415/145 |
| 2017/0058761 | A1* | 3/2017 | Stilgenbauer | F02B 37/183 |
| 2018/0073425 | A1* | 3/2018 | Stilgenbauer | F02B 37/183 |

FOREIGN PATENT DOCUMENTS

| | | | | | |
|---|---|---|---|---|---|
| DE | | 3336879 | A1 * | 4/1985 | ............... F16K 1/24 |
| DE | | 4439432 | C1 | 11/1995 | |
| DE | 102006022482 | A1 | | 12/2007 | |
| DE | 102011002918 | A1 | | 12/2011 | |
| EP | | 1256703 | A2 | 11/2002 | |
| GB | | 1443887 | A * | 7/1976 | ............... F16K 1/24 |
| GB | | 2000574 | A * | 1/1979 | ............... F16K 1/24 |
| GB | EP 1707790 | A1 * | | 10/2006 | ............ F02M 26/39 |
| JP | | 01179132 | U | 12/1989 | |
| WO | | 2008149060 | A2 | 12/2008 | |
| WO | | 2010135104 | A2 | 11/2010 | |
| WO | | 2013115206 | A1 | 8/2013 | |

OTHER PUBLICATIONS

International Search Report and Written Opinion in International Application No. PCT/US2015/029138, dated Jul. 8, 2015.
European Office Action dated Sep. 8, 2017, in European Application No. EP 15722640.8.
European Search Report issued in European Application No. 18173594.5 dated Sep. 4, 2018.
Office Action issued in European Application No. 18173594.5 dated Sep. 24, 2018.
Chinese Office Action (with English language translation) dated Aug. 8, 2018, in Chinese Application No. 201580010049.8.

* cited by examiner

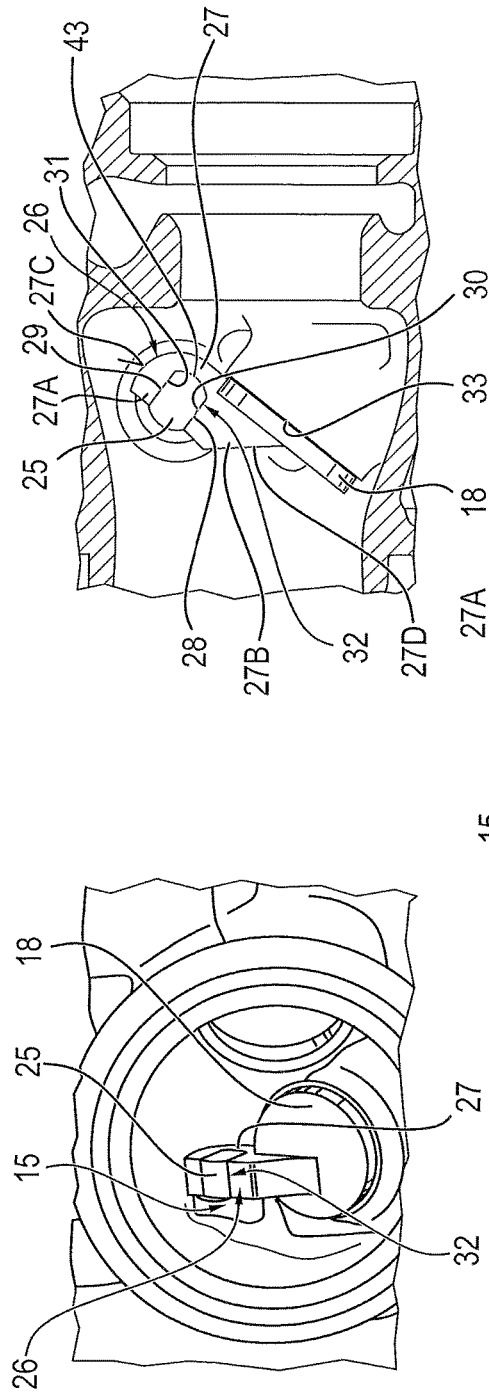
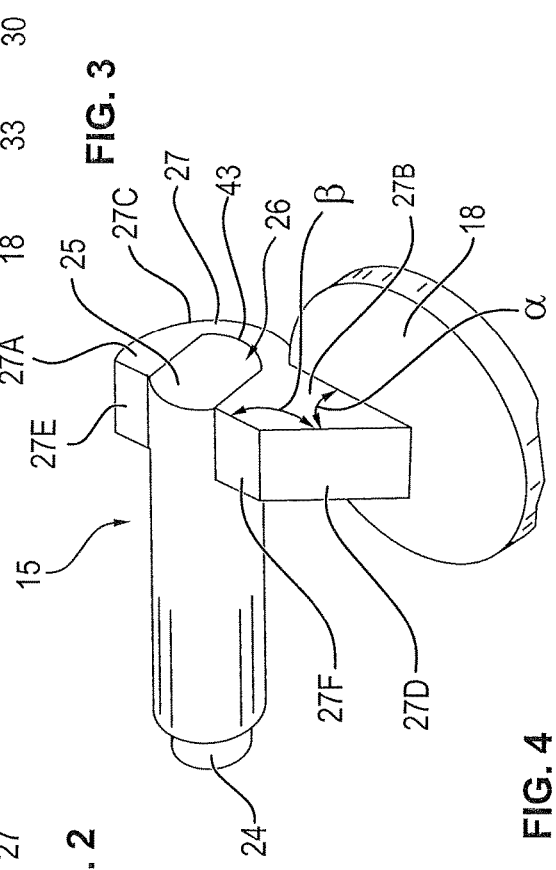
FIG. 2
FIG. 3
FIG. 4

CONTROL ARRANGEMENT OF AN EXHAUST-GAS TURBOCHARGER

BACKGROUND OF THE INVENTION

Field of the Invention

The invention relates to a control arrangement of an exhaust-gas turbocharger, and to a method of assembling a control arrangement of an exhaust-gas turbocharger.

Description of the Related Art

A control arrangement of this type is known from DE 10 2009 048 125 A1. This known control arrangement is a wastegate arrangement for a turbine, wherein the charge pressure regulation is performed by way of a bypass at the turbine. For this purpose, via a bypass recess which is of correspondingly large form, some of the exhaust gas is, by way of a control means in the form of a valve disk, conducted so as to bypass the turbine wheel of the turbine. In this case, the spindle and the valve disk form an assembly.

It is therefore an object of the present invention to provide a control arrangement which permits an improved sealing action between valve disk and valve seat of the control arrangement.

BRIEF SUMMARY OF THE INVENTION

By contrast to the prior art, it is provided according to the invention that the valve disk and the spindle are separate components. In this way, in order to improve the sealing action between valve disk and valve seat, the valve disk can, during assembly, be held firmly with sealing action against the valve seat and connected, in particular welded, to the spindle in this state. In this way, it is advantageously possible for tolerances to be compensated and a perfected sealing action to be attained.

The dependent claims contain advantageous developments of the invention.

In a particularly preferred embodiment, the connecting means preferably has a multiplicity of components, by means of which it is possible to carry out adaptations to particular installation situations or configurations of the control arrangements of the turbocharger.

In particular, it is possible for the connecting means to comprise a spherical segment which can be connected to the second end region of the spindle which is arranged within the bearing housing.

In this embodiment, the connecting means furthermore advantageously has an inner lever by means of which the spherical segment and thus the second end region, arranged within the bearing housing, of the spindle can be connected to the valve disk.

In a further particularly preferred embodiment, the inner lever may comprise two lever sections. In this case, one of the lever sections may be of cranked form, preferably so as to be cranked by 90°, and may either directly adjoin a second spherical segment, which is connectable to the valve disk, or be connected to the second spherical segment via a second lever section.

The provision of a second spherical segment which can be inserted into a receiving recess, of complementary form, of the valve disk, yields the advantage that the assembly process is particularly straightforward even in the presence of relatively large tolerances, and the achievable sealing action at the valve seat can be further improved.

It is furthermore an object of the present invention to specify a method for assembling a control arrangement of an exhaust-gas turbocharger, by means of which method it is possible to achieve an improved sealing action between valve disk and valve seat of the control arrangement, which method is furthermore technically more straightforward to carry out.

According to the invention, the individual parts of the control arrangement are initially produced in the form of a bushing, a spindle, a valve disk, an intermediate piece and an outer lever.

For the assembly of the control arrangement, it is initially the case that the bushing is inserted, in particular pressed, into a recess of the turbine housing.

After the insertion of the bushing, the spindle is inserted into the bushing.

In the subsequent step, the valve disk is placed against a wastegate opening of the turbine housing, and an intermediate piece is mounted onto an end of the spindle. The mounted intermediate piece is connected, in particular welded, to the end of the spindle, wherein, in a particularly preferred embodiment, a spot weld is initially formed, and then those further regions between the intermediate piece and the end of the spindle that are accessible to the welding device are filled with further welds.

After the connection of the intermediate piece to the spindle, an angle between the outer lever and the spindle relative to the valve disk is adjusted and the lever is fastened, in particular welded, to the spindle.

The lever is thereupon pulled on in the closing direction of the valve disk, wherein, in other words, the valve disk is pressed against the valve seat. In this state, in the final method step, the valve disk is connected, in particular welded, to a spherical segment of the spindle, wherein in turn, in a particularly preferred embodiment, a spot weld is initially formed before further welding is performed.

BRIEF DESCRIPTION OF THE SEVERAL VIEWS OF THE DRAWINGS

Further details, advantages and features of the present invention can be found in the following description of exemplary embodiments with reference to the drawing, in which:

FIGS. 2 and 3 show perspective views of the valve disk and of the spindle from different viewing directions.

FIG. 4 shows a perspective illustration of the spindle and of the valve disk,

DETAILED DESCRIPTION OF THE INVENTION

Figure 1:
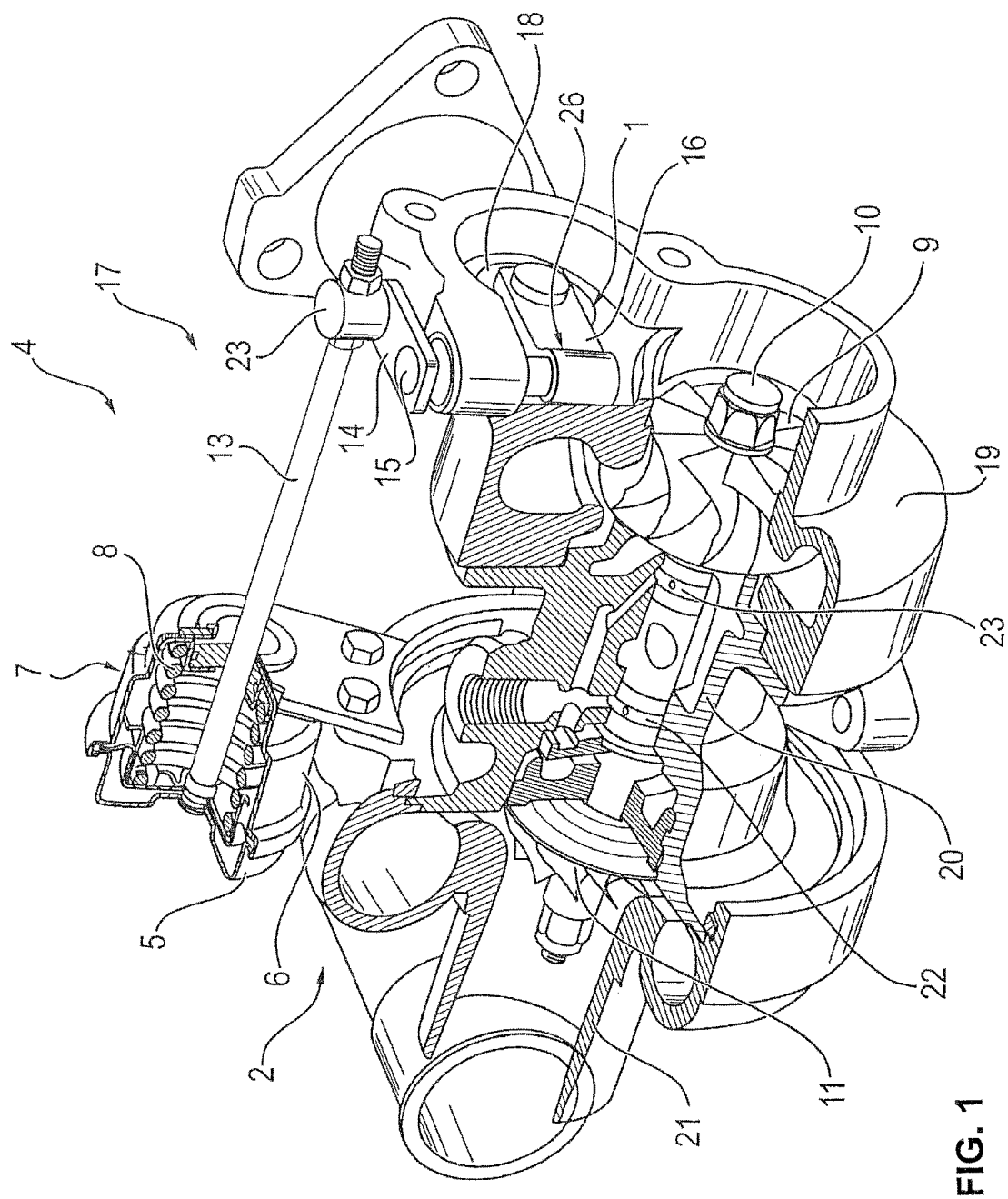
FIG. 1 shows a perspective sectional illustration of an embodiment of an exhaust-gas turbocharger according to the invention.

FIG. 1 is a perspective illustration of an embodiment of an exhaust-gas turbocharger 4 according to the invention, which comprises a charger housing 2. The charger housing 2 is assembled from a turbine housing 19, a bearing housing 20 and a compressor housing 21, which are in each case connected to one another as shown in detail in FIG. 1.

The exhaust-gas turbocharger 4 is equipped with a control arrangement 1, which may be either a wastegate valve arrangement or a regulating valve arrangement. FIG. 1 illustrates a wastegate valve arrangement as a control arrangement 1. The control arrangement 1 accordingly has a spindle 15 which has a first end region 24 which is visible in FIG. 4 and which is arranged outside the (in this case) turbine housing 19 and to which an outer lever 14 is fixed. The spindle 15 furthermore has a second end region 25 arranged within the turbine housing 19. Furthermore, in the embodiment illustrated in FIG. 1, a control means 18 in the form of a valve disk of the control arrangement 1 is illustrated, the control means being connected to the spindle 15.

The exhaust-gas turbocharger 4 as per the illustration in FIG. 1 furthermore has an actuating device 17 which comprises an actuator 7 which, in the embodiment illustrated in FIG. 1, is fixed to the compressor housing 21 by way of a bracket 3. The actuator 7 may be in the form of a pneumatic control capsule or in the form of an electric actuator (E-actuator). As shown in FIG. 1, the actuator 7 has a regulating rod 13 which is connected to the outer lever 14 by way of a connecting piece 23. When the regulating rod 13 is moved longitudinally by the actuator 7, the lever 14 is pivoted, and thus the spindle 15 and the valve disk 18 fastened thereto are pivoted in order to open and close a wastegate valve opening that is not visible in FIG. 1.

As can be seen from a juxtaposition of FIGS. 2 to 4, the valve disk 18 of the control arrangement 1 is connected to the spindle 15, the valve disk and spindle being manufactured as separate components, wherein the spindle 15 is connected by way of its second end region 25 to the valve disk 18 by way of a connecting means 26.

As is furthermore shown in FIGS. 2 to 4, the connecting means 26 has a fork-shaped fixing region 27 which is arranged, preferably integrally, on the valve disk 18, which fixing region, in the state in which it is fixed to the spindle 15, engages around the end region 25 of the spindle 15.

As is shown in this regard in FIG. 3, it is the case in the particularly preferred embodiment in the figures that the second end region 25 is equipped with two flattened abutment surfaces 28 and 29 that are oriented parallel. The fork-shaped fixing region 27 is equipped with correspondingly formed counterpart surfaces 30 and 31 which bear against the abutment surfaces 28 and 29 in the assembled state.

It is furthermore the case in the particularly preferred embodiment that, in the region indicated by the arrow, a welded connection 32 is provided, the weld faces of which are preferably provided between the abovementioned surfaces 28 to 31 and also in the rounded transition region 43 between these surfaces.

As can also be seen from a juxtaposition of FIGS. 3 and 4, the fixing region 27 has two oppositely arranged fork regions 27A and 27B which bear counterpart surfaces 30 and 31. The fork region 27A has a rounded outer surface 27C, whereas the fork region 27B comprises an oblique surface 27D which is arranged at an angle $\alpha$ with respect to the surface of the valve disk 18. Both fork regions 27A and 27B comprise top surfaces 27E and 27F, respectively, which lie in a plane. The surfaces 27D and the surfaces 27F enclose an obtuse angle $\beta$, whereas the angle $\alpha$ is an acute angle.

With this refinement, for the assembly of the valve disk 18 on the spindle 15, it is possible for the valve disk 18 to be pressed sealingly against the valve seat 33 and to be connected, preferably welded, to the spindle 15, in particular to the second end region 25 thereof, in this state. As discussed in the introduction, it is possible in this way for tolerances to be compensated and for the desired sealing action between valve disk 18 and sealing seat 33 to be realized.

Figure 5A:
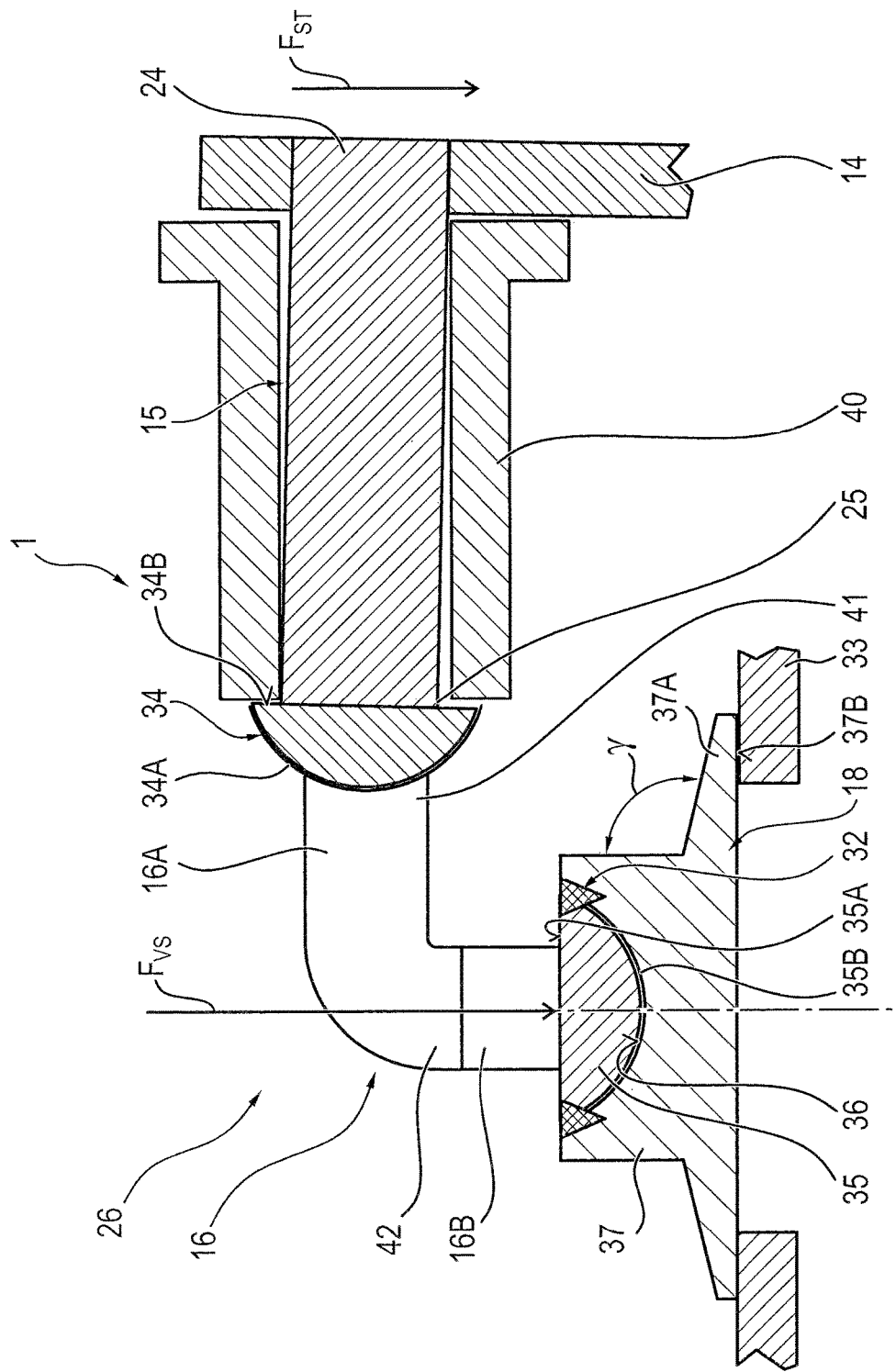
FIG. 5A shows a sectional illustration of a second embodiment of a control arrangement according to the invention.

FIG. 5A is an illustration of a further embodiment of the control arrangement 1 according to the invention, in which all elements that correspond to those in FIGS. 1 to 4 are identified by the same reference signs.

Accordingly, the control arrangement 1 as per the embodiment of FIG. 5A likewise has a spindle 15 which is guided by means of a bearing arrangement 40 in the charger housing (not illustrated) and the first end region 24, arranged outside the charger housing, of which is connected to an outer lever 14. As shown in FIG. 5A, it is the case in this embodiment that the bearing arrangement 40 extends over the entire length of the spindle 15, with the exception of the end regions 24 and 25 of the latter, which project out of the bearing arrangement.

In the embodiment illustrated in FIG. 5A, the second end region 25, arranged within the charger housing, is likewise connected, by way of the connecting means 26, to the valve disk 18. However, in the embodiment illustrated in FIG. 5A, the connecting means 26 has a multiplicity of components. These components include firstly a spherical segment 34 which has a circular base surface 34B which is connected to the second end region 25.

Furthermore, the spherical segment 34 has a spherical cap 34A which is adjoined, in the embodiment as per FIG. 5A, by an inner lever 16 with two lever sections 16A and 16B. The first lever section 16A is connected by way of one lever end 41 to the spherical cap 34A and by way of a second lever end 42 to the second lever section 16B.

In the embodiment of FIG. 5A, the second lever section 16B is adjoined by a second spherical segment 35. The second spherical segment 35 is connected by way of its circular base surface 35A to the second lever section 16B. The second spherical segment 35 also has a spherical cap 35B, which is received entirely in a receiving space 36 of the valve disk 18.

In the embodiment illustrated in FIG. 5A, the receiving space 36 is arranged in a cylindrical connection part 37 of the valve disk 18. The connection part 37 has a valve disk region 37A which is widened in a radial direction R, which adjoins the connection part 37 at an obtuse angle $\gamma$, and which has a contact surface 37B which lies against the valve seat 33.

This configuration yields a particularly stable embodiment of the valve disk 18, which, even with fine dimensioning and associated low weight, yields surprisingly low inertial forces. Here, tests carried out within the context of the invention have shown that, despite very slender dimensioning, reduced wear of the control arrangement according to the invention is attained, which is surprising in particular as the control arrangement is used in extremely critical temperature ranges of over 900° and under alternating gas pressures, which is associated with high loading.

Furthermore, FIG. 5A shows a further element of the connecting means 26, which may for example be a welded connection 32, preferably a laser-welded connection, by means of which the spherical segment 35 can be connected to the valve disk 18.

This means that, in the case of the embodiment of the control arrangement 1 as per FIG. 5A, too, the valve disk 18 and the spindle 15 are separate components which can be connected to one another by way of the connecting means 26 described above. Thus, in this embodiment, too, it is possible, in order to improve the sealing action between the valve disk 18 and the valve seats 33, for the valve disk 18 to be held firmly with sealing action against the valve seat 33 during the assembly process, as indicated by the arrow $F_{VS}$. In this state, by virtue of the second spherical segment 35 being fixed in the receiving space 36, the connection between valve disk 18 and spindle 15 is produced, this being performed in particular by welding. In this way, it is advantageously possible in this embodiment, too, for tolerances to be compensated and a perfected sealing action to be attained.

In principle, it is possible for the spindle 15, the first spherical segment 34, the inner lever 16 with its two lever sections 16A and 16B in the example, and the second spherical segment 35 to be formed as a unipartite component.

It is however also possible for the stated elements to each be formed as individual components, which can be connected, in particular welded, to one another during the course of assembly.

It is additionally pointed out that the arrow $F_{ST}$ symbolizes the direction of the occurring stresses and the resulting tolerances, which can be compensated by way of the above-discussed assembly option for attaining a perfected sealing action.

In the case of the embodiment illustrated in FIG. 5A, the first lever section 16A is, owing to the arrangement of the valve disk 18, of cranked form, with a particularly preferred angle of the cranked form being 90°.

Furthermore, a second lever section 16B is provided which is of rectilinear form. With a corresponding arrangement, it would however also be possible for the second spherical segment 35 to directly adjoin the second end 42 of the first lever section 16A.

Furthermore, it would likewise be possible, with a corresponding orientation of the valve disk 18, for the first section 16A to be formed without a cranked configuration.

Figure 5B:
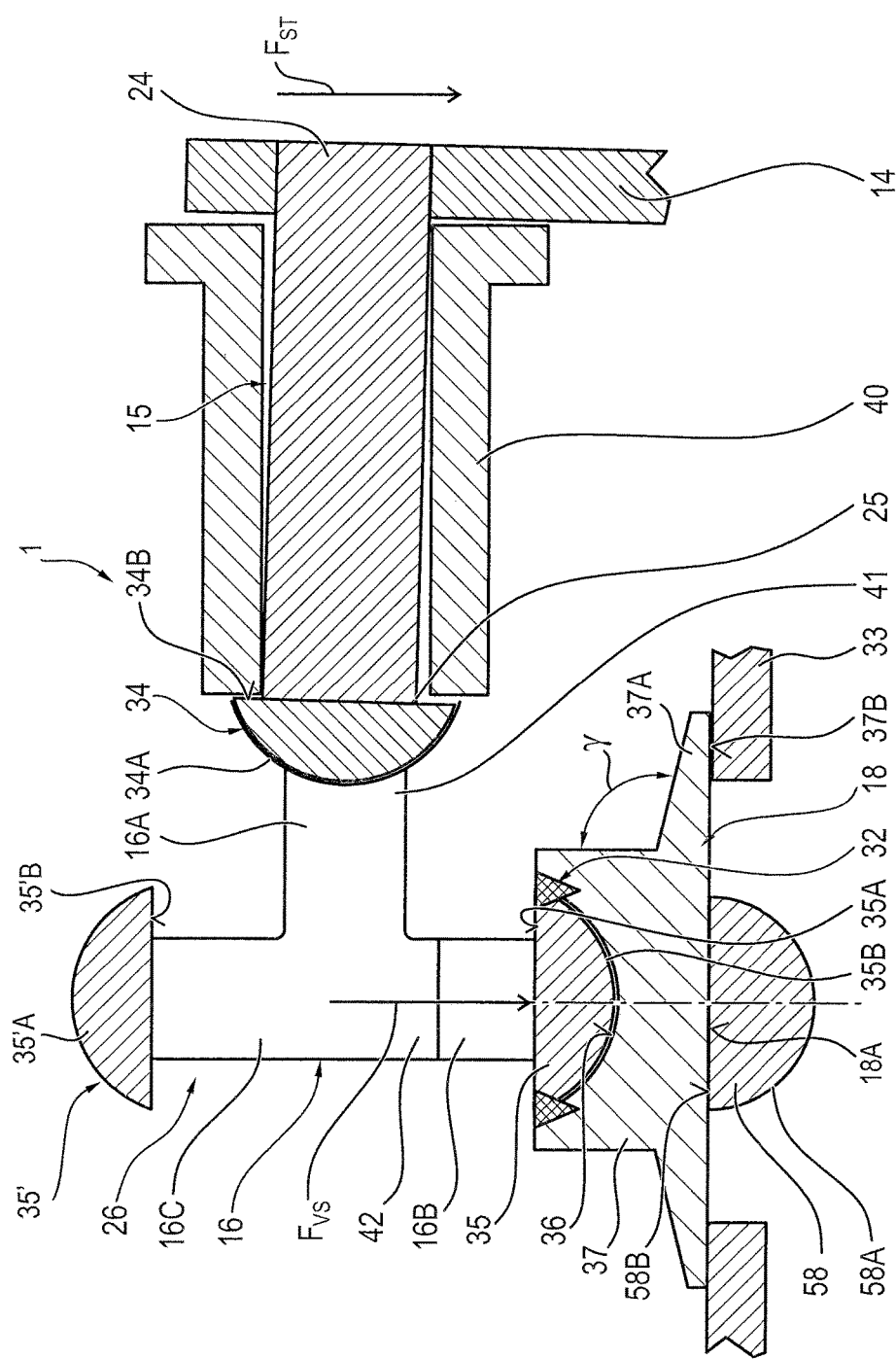
FIG. 5B shows a sectional illustration, corresponding to FIG. 5A, of an alternative design of the second embodiment of a control arrangement according to the invention.

FIG. 5B shows an alternative design of the second embodiment as per FIG. 5A. Therefore, all the features that correspond to the embodiment as per FIG. 5A are denoted by the same reference signs, such that in this regard, reference may be made to the description above.

The embodiment of the control arrangement as per FIG. 5B is characterized by the provision of a third lever section 16C which, corresponding to the lever section 16B, in this embodiment branches off at right angles from the first lever section 16A but in the opposite direction to the second section 16B, as can be readily seen from the diagrammatic illustration of FIG. 5B.

At its free end, the third lever section 16C is equipped with a third spherical segment 35' which is connected by way of its circular base surface 35'A to the free end of the third lever section 16C, for example by way of a welded connection. The third spherical segment 35' furthermore has a spherical cap 35'B, wherein the third spherical segment 35' in the particularly preferred embodiment illustrated in FIG. 5B is of identical form to the second spherical segment 35. Accordingly, the provision of the third lever section 16C with its third spherical segment 35' attached thereto, forms a counterweight with respect to the second lever section 16B and the spherical segment 35 attached thereto, which improves the acceleration and vibration characteristics of the control arrangement 1 as per the embodiment of FIG. 5B.

Furthermore, the control arrangement 1 as per the embodiment of FIG. 5B has a fourth spherical segment 58 which has a spherical cap 58A which projects into the wastegate opening when the valve disk 18, in the sealing position illustrated in FIG. 5B, lies against the valve seat 33. For this purpose, the spherical segment 58 is fastened, for example by way of a welded connection, preferably centrally by way of its circular base surface 58B to an in this case central surface region 18A of the valve disk 18. The provision of the spherical segment 58 furthermore increases the sealing action of the sealing seat between the valve disk 18 and the valve seat 33, and likewise improves the vibration characteristics, in particular under the action of pressure shock loads on the valve disk 18.

Figure 6:
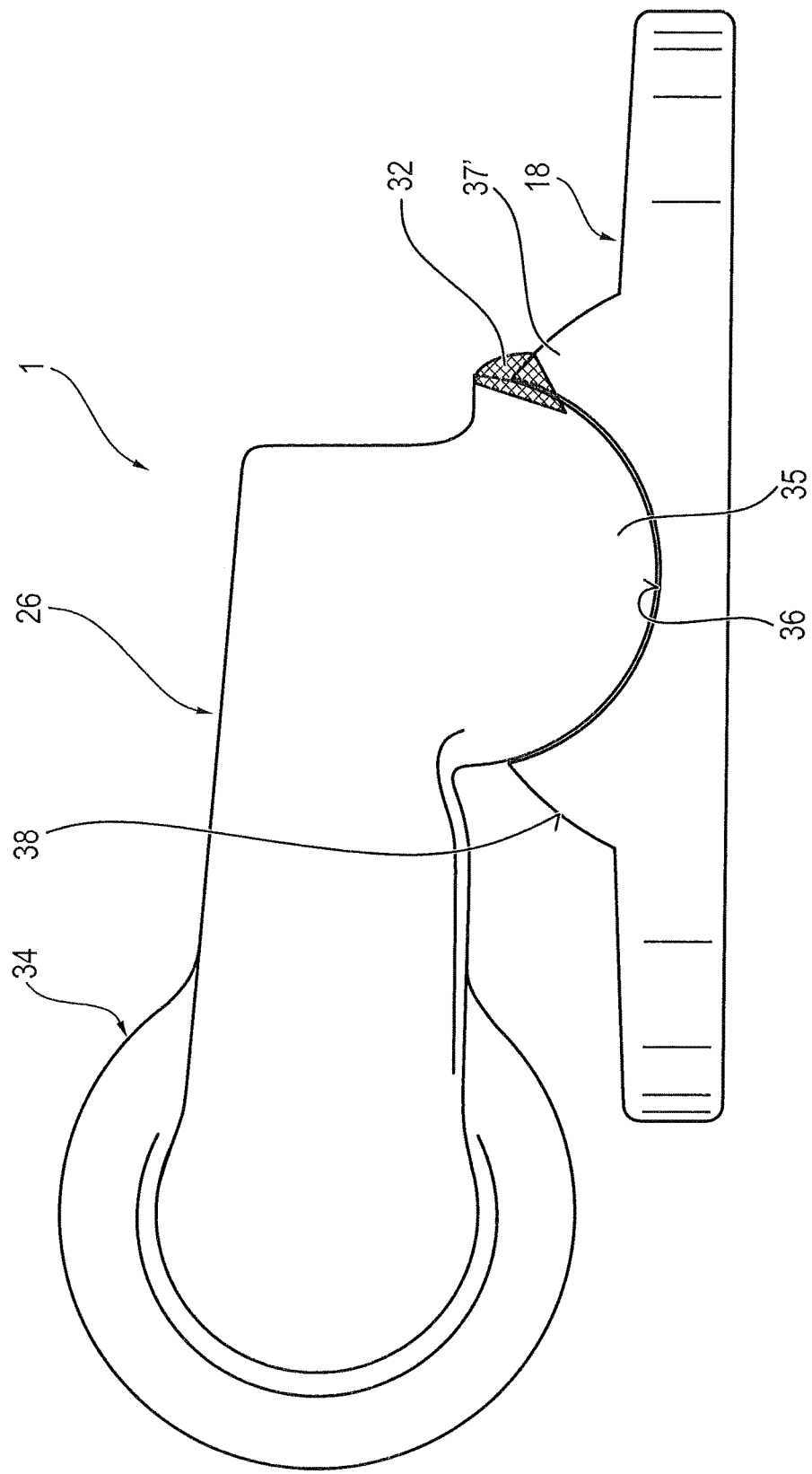
FIG. 6 shows a front view of a third embodiment of a control arrangement according to the invention.

The embodiment in FIG. 6 corresponds to that of FIG. 5, such that reference may be made to the description of FIG. 5.

In the embodiment illustrated in FIG. 6, however, the connection part 37' has a curved outer surface 38. This yields the advantage of a particularly compact design.

Figure 7:
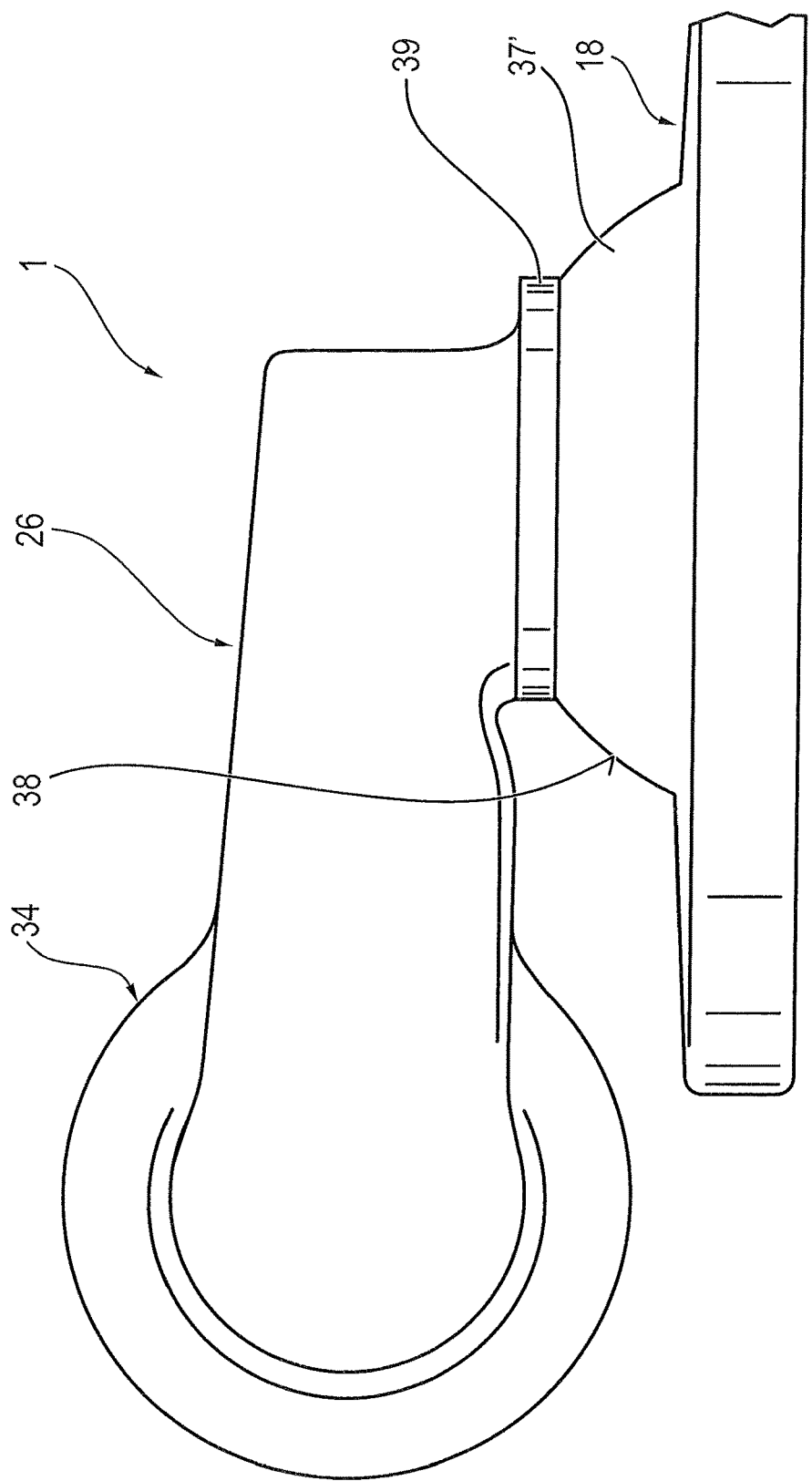
FIG. 7 shows an illustration, corresponding to FIG. 6, of a further embodiment of the control arrangement according to the invention.

The embodiment in FIG. 7 in turn corresponds to that of FIG. 5, such that in this regard, too, reference may be made to the embodiment as per FIG. 5.

In the embodiment as per FIG. 7, however, there is provided, as a further feature, a contact collar 39 which lies against the connection region 37'.

Figure 8E:
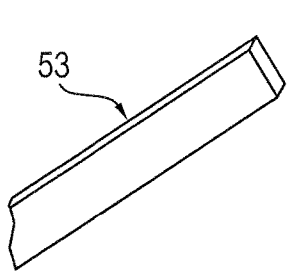
FIGS. 8A-8E show individual components of a further embodiment of the control arrangement according to the invention.
Figure 8A:
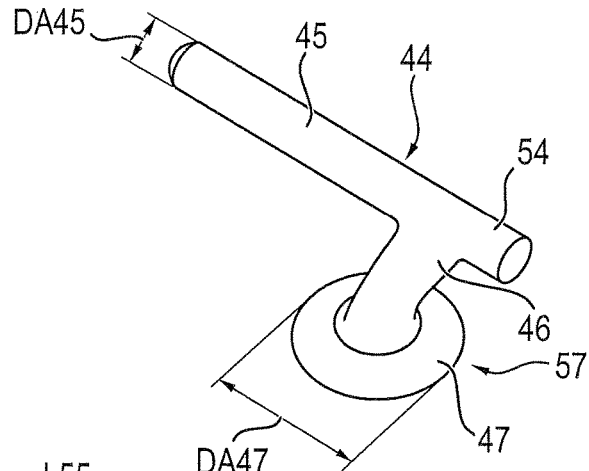
Figure 8C:
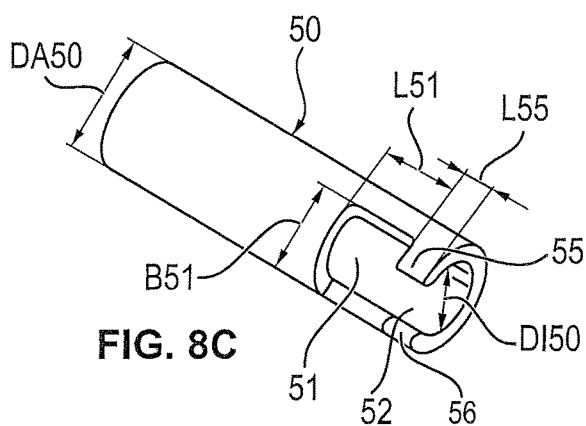
Figure 8B:
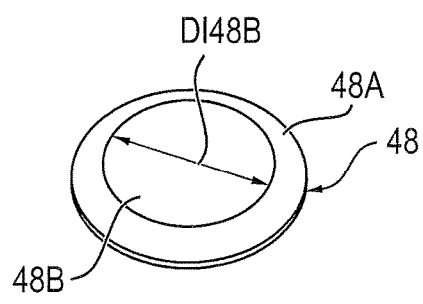
Figure 8D:
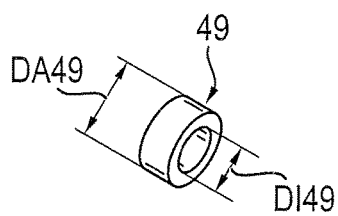
Figure 9:
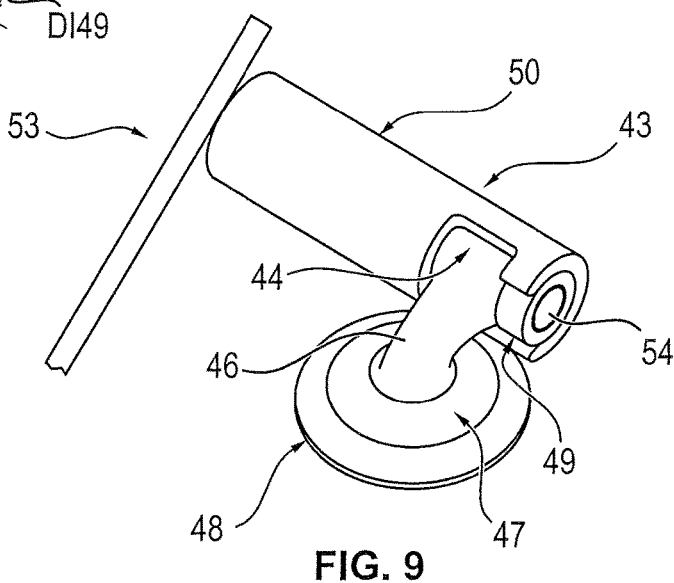
FIG. 9 shows the control arrangement composed of the components as per FIGS. 8A to 8E in the fully assembled state.

FIGS. 8A to 8E show the individual parts of a further embodiment of a control arrangement 43 according to the invention, which is shown in FIG. 9 in the assembled state.

Accordingly, the control arrangement 43 as per FIG. 8A has a spindle 44 with a cylindrical spindle body 45 which has an outer diameter dA45 which is constant over the entire length of the spindle body 45.

In the region of an end 54 of the spindle body 55 which, in the installed state, is an inner end of the spindle 44, the spindle body 45 is adjoined, substantially at right angles, by a connecting piece 46, which may be connected integrally to the spindle body or which may likewise be an individual part which can be connected, in particular by way of a welded connection, to the spindle body 45.

The connecting piece 46 bears, at its free end, a spherical segment 47 with an external diameter DA47.

FIG. 8B shows a valve disk 48 which can be connected to the spherical segment 47. For the connection, the valve disk 48 has a receiving recess 48B which is arranged in a spherical cap 48A and which has an internal diameter DI48B. The internal diameter DI48B corresponds to the external diameter DA47, or is configured to be slightly larger than the outer diameter DA47.

FIG. 8C shows a bushing 50 that can be inserted into the spindle 44. For this purpose, the bushing 50 has an internal diameter DI50 and has an external diameter DA50 which is constant over the entire length of the bushing 50.

As shown in FIG. 8C, the bushing 50 has a passage recess 51, the length L51 and width B51 of which are adapted to the dimensioning of the connecting piece 46 such that, when the spindle 44 is inserted, the connecting piece can project through the passage recess 51, as can be seen from the illustration of FIG. 9.

The bushing 50 furthermore has a tongue 55 which has a length L55 slightly shorter than the length L51 and which, together with an opposite housing region 56 of the bushing 50, delimits a slot 52. As shown in FIG. 8C, the opening angle of the slot 52 is, owing to the tongue 55, smaller than the opening angle of the passage recess 51.

Finally, FIG. 8E shows a lever 53 which is an outer lever, which means that it is arranged outside the turbine housing when the control arrangement 43 is installed in the turbine housing. Said outer lever 53 may self-evidently be adapted to the respective dimensioning and the respective usage of the control arrangement 43, but is of conventional design with regard to its geometry and dimensioning. These explanations show that, in this embodiment, the connecting piece 46 and the spherical segment 47 form a connecting means 57.

A possible method for the assembly of a control arrangement of an exhaust-gas turbocharger 4 will be discussed below on the basis of the embodiment of the control arrangement 43 as per FIGS. 8A to 8E and 9. Accordingly, the individual constituent parts as per FIGS. 8A to 8E are firstly provided.

In a first assembly step, the bushing 50 is arranged in a turbine housing recess, wherein the bushing is preferably pressed into the recess. Subsequently, the spindle 44 is inserted into the bushing 50, such that the connecting piece 46 projects out of the bushing 50, as can be seen in FIG. 9.

The valve disk 48 is subsequently mounted onto a wastegate opening of the valve seat 33, as can be seen for example from the illustration of FIG. 5.

Subsequently, the intermediate piece 49 is pushed onto the end 54 and connected, preferably welded, thereto.

In the subsequent method step, an angle between the outer lever 53 and the spindle 44 relative to the valve disk 48 is adjusted, and the lever 53 is fixed, preferably welded, to the cylindrical spindle body 45 of the spindle 44. In this state, the lever 53 is pulled on in the direction of the valve disk 48, as has already been discussed with reference to FIG. 5. In this state, with the lever 53 being pulled on, the valve disk 48 is finally connected, preferably welded, to the spherical segment 47, for which purpose the spherical segment 47 is inserted into the receiving recess 48B. In the case of this connection, too, a welded connection is a particularly preferred embodiment.

Figure 10:
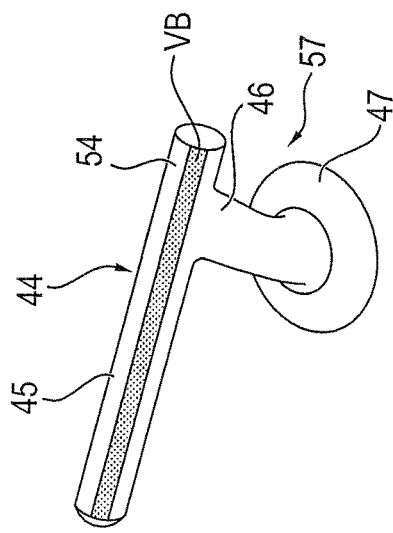
FIG. 10 shows an illustration, corresponding to FIG. 8A, of a spindle with a closing region illustrated in schematically simplified form.

FIG. 10 corresponds to the illustration of the spindle as per FIG. 8A, such that with regard to the features of the spindle 44, reference may be made to the above description of FIG. 8A. In FIG. 10, a region of wear is schematically symbolized by the surface region VB, which extends at least substantially over the entire length of the spindle body 45. Tests carried out within the context of the invention have shown that the region of wear VB, which as stated extends substantially over the entire length of the spindle body 45, arises during operation but surprisingly has no influence on the sealing action of the sealing seat between the valve disk 18 and the valve seat 33. This is the case in particular if the region of wear VB is oriented at least substantially parallel to the valve disk surface.

Figure 11:
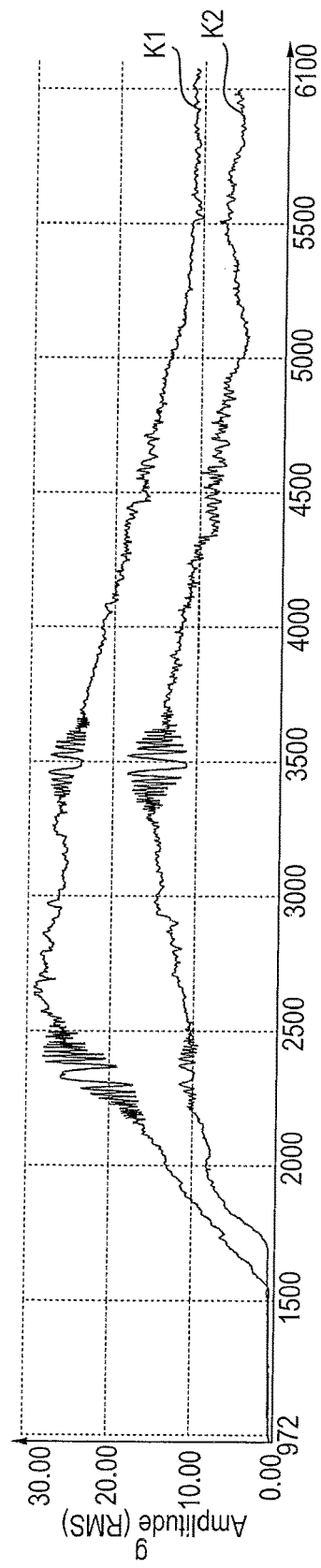
FIG. 11 shows a coordinate system with two curves for illustrating the acceleration behavior of a control arrangement according to the prior art and of an embodiment of the control arrangement according to the invention.

FIG. 11 shows two curves K1 and K2 illustrated in an X-Y coordinate system, with the acceleration plotted on the X axis and the amplitude plotted on the Y axis. Here, the curve K1 represents a valve disk according to the prior art, for example WO 2014/011468 A1, whereas the curve K2 represents an embodiment of a control arrangement according to the invention. The comparison between the two curves K1 and K2 clearly shows that the control arrangement according to the invention exhibits smoother acceleration and vibration characteristics than the control arrangement according to the prior art, wherein the smoother vibration characteristics have an advantageous effect on the function of the control arrangement according to the invention.

In addition to the above written disclosure of the invention, reference is hereby explicitly made to the illustrative presentation thereof in FIGS. 1 to 11.

LIST OF REFERENCE SIGNS

1 Control arrangement
2 Charger housing
3 Bracket
4 Exhaust-gas turbocharger
5 Housing upper part
6 Housing lower part
7 Actuator housing
8 Spring
9 Turbine wheel
10 Rotor shaft
11 Compressor wheel
12 Journal
13 Regulating rod
14 Outer lever
15 Spindle
16 Inner lever
16A, 16B, 16C First, second and third lever section
17 Operating device
18 Control means (valve disk)
18A Preferably central surface region
19 Compressor housing
20 Bearing housing
21 Compressor housing
22, 23 Bearing
24, 25 End region
26 Connecting means
27 Fixing region
27A, 27B Fork regions
27C Outer surface
27D, 27F Oblique surfaces
27E Top surfaces
28, 29, 30, 31 Abutment surfaces or counterpart surfaces
32 Welded connection
33 Valve seat
34 First spherical segment
34A Spherical cap
34B Circular base surface
35 Second spherical element
35A Circular base surface
35B Spherical cap
35' Third spherical segment
35'A Spherical cap
35'B Circular base surface
36 Receiving space
37, 37' Connection region 37A Valve disk region
37B Contact surface
38 Outer surface
39 Contact collar
40 Bearing arrangement
41 First shaft end
42 Second shaft end
43 Control arrangement
44 Spindle
45 Cylindrical spindle body
46 Connecting piece
47 Spherical segment
48 Valve disk
48A Spherical cap
48B Receiving recess
49 Intermediate piece
50 Bushing
51 Passage recess
52 Slot
53 Outer lever
54 End of the spindle body
55 Tongue
56 Housing region
57 Connecting means
58 Fourth spherical element
58A Spherical cap
58B Circular base surface
L51, L55 Lengths
B51 Width
$F_{VS}$ Force on the sealing seat
$F_{ST}$ Loading direction
VB Wear region
K1, K2 Curves
α, •, γ Angles
dA45, dA47, DI48B, DI49, dA49, dA50, DI50 Diameter values

What is claimed is:

1. A control arrangement (1) of an exhaust-gas turbocharger (4) which has a charger housing (2), wherein the control arrangement (1) is a wastegate valve arrangement or a regulating valve arrangement, the control arrangement (1) comprising:
a spindle (15) which has
a first end region (24) arranged outside the charger housing (2) and having an outer lever (14) operatively connected to an actuator; and
a second end region (25) arranged within the charger housing (2), and connected to an inner lever (16); and
a valve disk (18) which is connected to the inner lever (16) and which interacts with a valve seat (33) to seal and unseal said valve seat (33);
wherein
the valve disk (18) and the inner lever (16) are introduced in the turbine housing as separate components; and
the inner lever (16) connects the spindle (15) to the valve disk (18) after alignment of the valve disk (18) on the valve seat (33) by welding while the outer lever (14) is pulled In a closing direction whereby the valve disk is pressed against the valve seat (33).

2. The control arrangement as claimed in claim 1, wherein the inner lever (16) is in the form of a fork-shaped fixing region (27) arranged on the valve disk (18), which fixing region engages around the second end region (25) of the spindle (15).

3. The control arrangement as claimed in claim 2, wherein the second end region (25) has flattened abutment surfaces (28, 29) which bear against counterpart surfaces (30, 31) of the fork-shaped fixing region (27).

4. The control arrangement as claimed in claim 2, wherein the flattened abutment surfaces (28, 29) of the second end region (25) and the counterpart surfaces (30, 31) of the fork-shaped fixing region (27) are welded to one another.

5. The control arrangement as claimed in claim 1, wherein the valve disk (18) and the inner lever (16) have complementary contacting convex and concave spherical segments.

6. The control arrangement as claimed in claim 5, wherein the second end region (25) is connected to a circular base surface (34B) of the valve disk (18).

7. The control arrangement as claimed in claim 5, wherein the spindle has a spherical segment (34) with a spherical cap (34A) which is connected to a first end (41) of the inner lever (16).

8. The control arrangement as claimed in claim 7, wherein the inner lever (16) has a first lever section (16A) which comprises the first lever end (41) and which is connected to a second lever section (16B) via a second lever end (42).

9. The control arrangement as claimed in claim 8, wherein the first lever section (16A) is cranked at a right angle to the first lever section 16A.

10. The control arrangement as claimed in claim 5, wherein the cylindrical connection part (37) and the valve disk (18) are formed in one piece.

11. The control arrangement as claimed in claim 5, wherein the spindle (15) and the inner lever (16) are formed as a unipartite component.

12. The control arrangement as claimed in claim 5, wherein the spindle (15) and the inner lever (16) are separate components which are welded to one another.

13. A control arrangement (1) of an exhaust-gas turbocharger (4) which has a charger housing (2), wherein the control arrangement (1) is a wastegate valve arrangement or a regulating valve arrangement, the control arrangement (1) comprising:
a spindle (15) which has
a first end region (24) arranged outside the charger housing (2) and operatively connected to an actuator; and
a second end region (25) arranged within the charger housing (2); and
a valve disk (18) which is connected to the spindle (15) and which interacts with a valve seat (33); wherein
the valve disk (18) and the spindle (15) are separate components; and
the second end region (25) connects the spindle (15) to the valve disk (18) via a connecting means (26) after alignment of the valve disk (18) on the valve seat (33);
wherein the connecting means (26) has a first spherical segment (34) which is connected to the second end region (25); and
wherein the connecting means (26) furthermore has a second spherical segment (35) which is connected at a base surface (35A) to the inner lever (16) and which has a spherical cap (35B) arranged in a receiving space (36) of the valve disk (18).

14. The control arrangement as claimed in claim 13, wherein the receiving space (36) is arranged in a cylindrical connection part (37) of the valve disk (18).

15. The control arrangement as claimed in claim 13, wherein the first spherical segment (34), the inner lever (16) and the second spherical segment (35) are separate components which are connected to one another.

16. The control arrangement as claimed in claim 13, wherein the first spherical segment (34), the inner lever (16) and the second spherical segment (35) are formed as a unipartite component.

17. The control arrangement as claimed in claim 13, wherein the first spherical segment (34), the inner lever (16) and the second spherical segment (35) are separate components which are welded to one another.

18. A method for assembling a control arrangement (43) of an exhaust-gas turbocharger (4), having the following method steps:
  a. inserting a bushing (50) into a turbine housing recess;
  b. inserting a spindle (44) into the bushing (50), the spindle (44) including a connecting piece (46);
  c. placing a valve disk (48) against a wastegate opening of the turbine housing;
  d. adjusting an angle between an outer lever (53) and the spindle (44) relative to the valve disk (48);
  e. fastening the outer lever (53) to the spindle (44); and
  f. welding the valve disk (48) to a spherical segment (47) and to the connecting piece (46) while the outer lever (53) is pulled in a closing direction whereby the valve disk (48) Is pressed against the valve seat (33).

19. The method as claimed in claim 18, wherein the inner lever (16) is provided with a spherical segment (35), the valve disk (18) is provided with a spherical receiving recess (36) of complementary form, and the spherical segment (35) is inserted into the receiving recess (36).

* * * * *